R. M. BROWN.
CONTROLLING MECHANISM FOR BOOSTER MOTORS.
APPLICATION FILED OCT 15, 1920.
1,380,348.
Patented June 7, 1921.
3 SHEETS—SHEET 2.
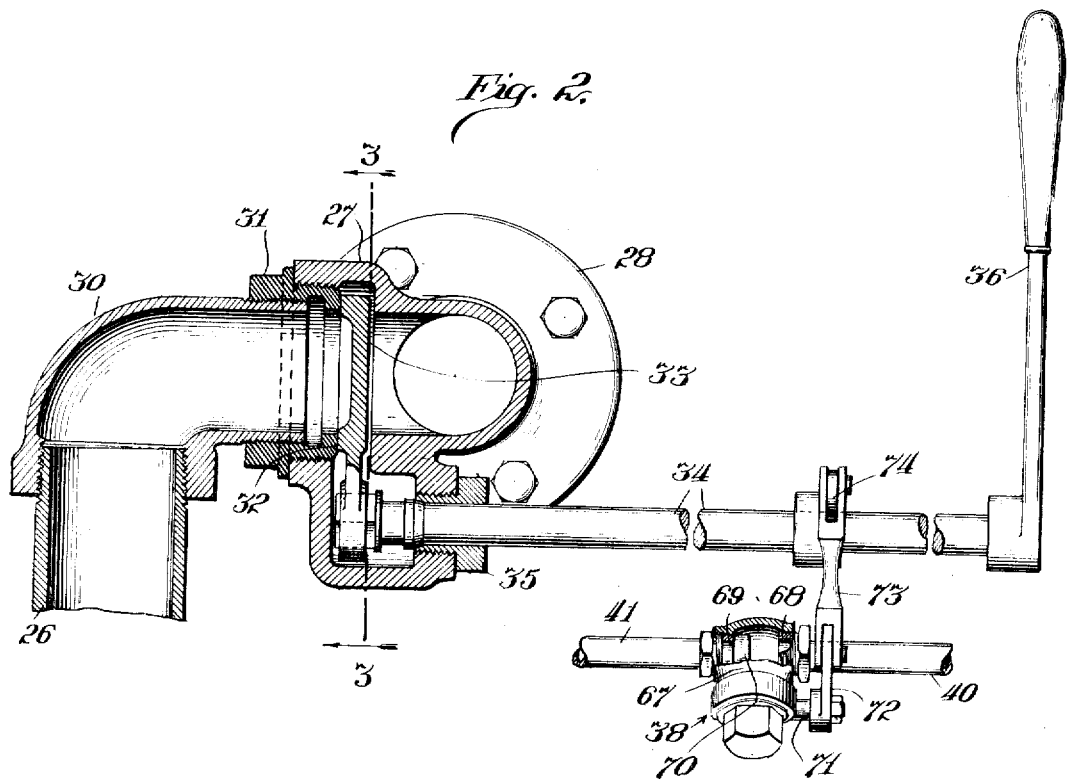
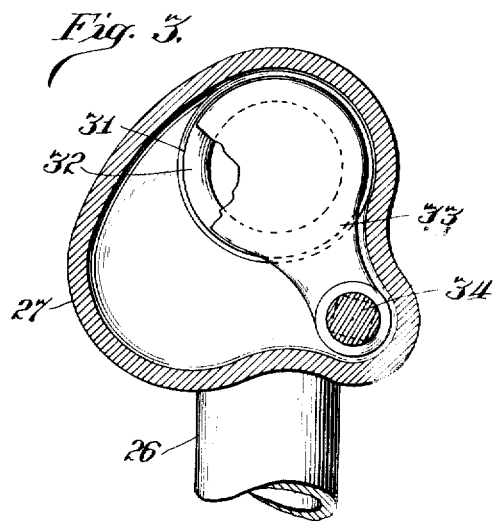
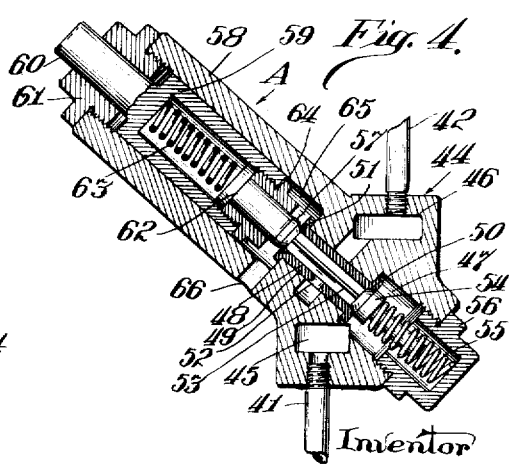
Inventor
Ray M. Brown
By
Synnestvedt & Lechner
Attorneys

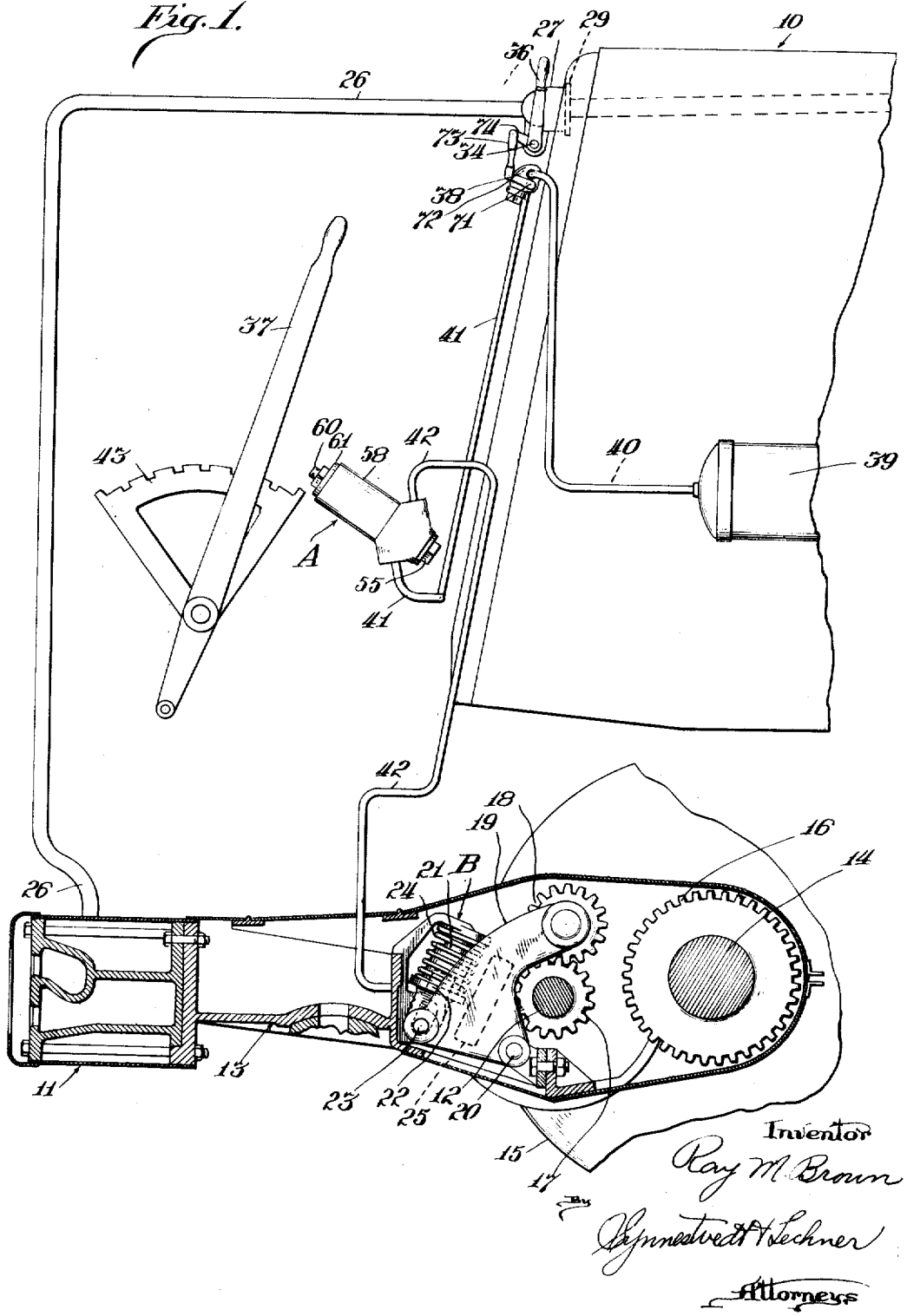

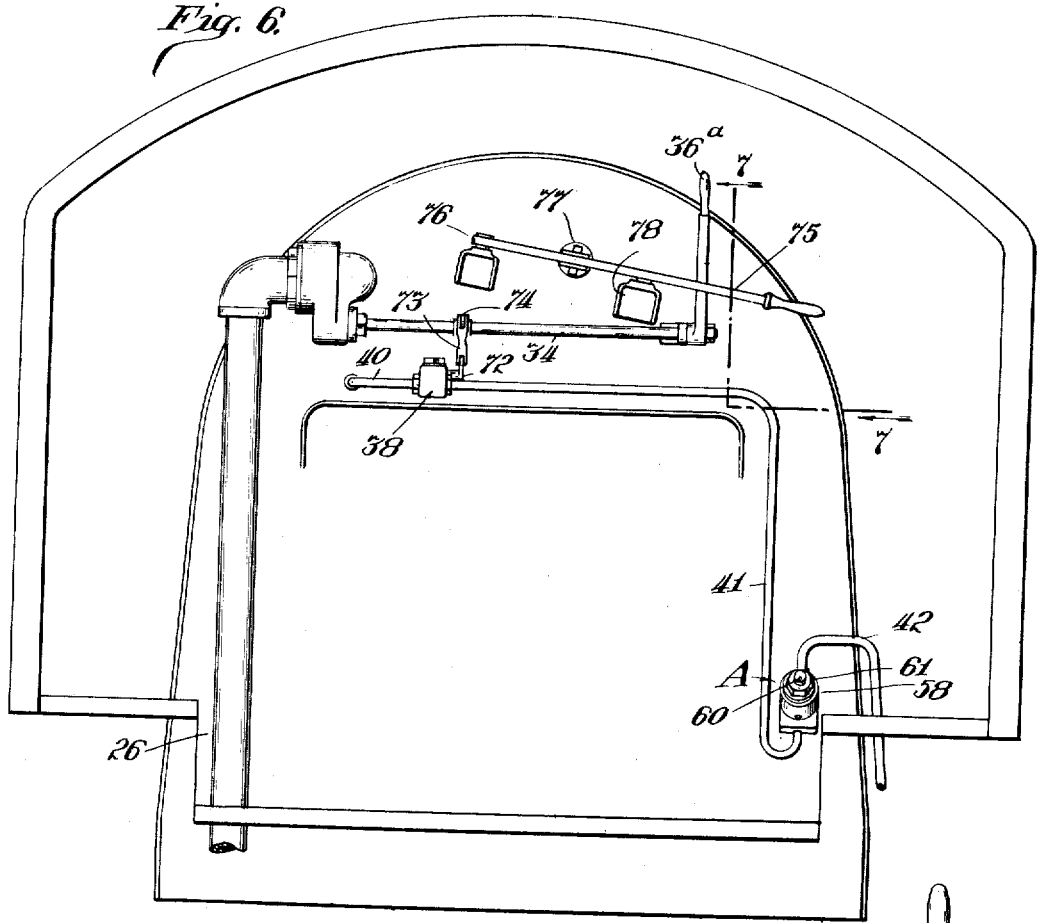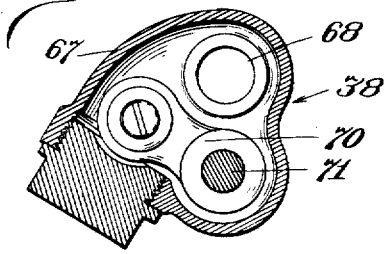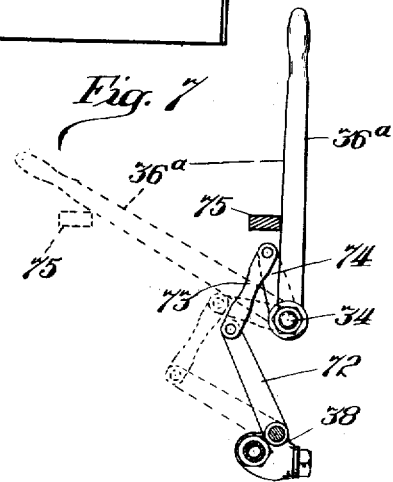

UNITED STATES PATENT OFFICE.

RAY M. BROWN, OF YONKERS, NEW YORK, ASSIGNOR TO HOWARD L. INGERSOLL, OF WHITE PLAINS, NEW YORK.

CONTROLLING MECHANISM FOR BOOSTER-MOTORS.

1,380,348.  Specification of Letters Patent.  Patented June 7, 1921.

Application filed October 15, 1920. Serial No. 417,122.

*To all whom it may concern:*

Be it known that I, RAY M. BROWN, a citizen of the United States, residing at Yonkers, in the county of Westchester and State of New York, have invented certain new and useful Improvements in Controlling Mechanism for Booster-Motors, of which the following is a specification.

My invention relates to mechanism for controlling the operation of an auxiliary or "booster" motor used on a locomotive for aiding the main driving means in starting the locomotive and propelling the same at comparatively low speeds; the combination of locomotive and booster motor being shown in the patent to Howard L. Ingersoll, No. 1,339,395, granted May 11, 1920.

One of the objects of the present invention is to provide an improved device for entraining and disentraining the booster motor from the axle of the locomotive which it is designed to drive, whereby possible accidental contact between the gears, when disengaged, is prevented and the mechanism is simplified and made more positive and certain in its operation.

A further object is to provide a booster controlling mechanism comprising a hand lever for operating the booster throttle valve and also a valve governing the application of motive fluid, compressed air preferably, to the mechanism which effects the entrainment of the booster with the locomotive axle, the invention contemplating a simple arrangement whereby the booster is entrained before it receives steam from the locomotive boiler.

A further object is to provide an arrangement of the booster operating lever with the throttle of the main driving means of the locomotive whereby the operation of the booster is made possible only when the main driving means of the locomotive is in operation. These features of novelty are combined with certain features of the controlling system shown in the Ingersoll patent above referred to, as will be hereinafter described, to provide a controlling mechanism which is simpler than the Ingersoll control system in respect to the compressed air mechanism employed, while giving reasonable protection against such accidental or wilful manipulation of the apparatus as might cause injury to the booster motor or its connections.

The invention is shown, in certain preferred embodiments, in the accompanying drawings wherein—

Figure 1 is a view, in elevation with certain parts in section, of a booster control mechanism constructed in accordance with my invention, the drawings being somewhat diagrammatic and illustrating only such parts of the locomotive structure as is necessary for a clear understanding of my invention.

Fig. 2 is a sectional view of the booster motor throttle and associated parts, the booster throttle lever and the air valve actuated thereby being shown in elevation.

Fig. 3 is a sectional view taken on line 3—3 of Fig. 2.

Fig. 4 is a sectional view of an air valve, conditioning the operation of the entrainment mechanism, which is actuated by the reverse lever of the locomotive.

Fig. 5 is a sectional view of the air valve shown in Figs. 1 and 2.

Fig. 6 is a view, in elevation, of the end of the locomotive boiler illustrating a modified form of booster controlling mechanism, and Fig. 7 is a sectional view on line 7—7 of Fig. 6.

Like characters of reference designate like parts in the several figures of the drawings.

Referring first to Figs. 1 to 5 inclusive, 10 designates the boiler of a locomotive, 11 the booster motor, shown fragmentarily, which is preferably a steam engine of any suitable type, and 12 is a crank shaft driven by the booster. This shaft may be journaled in bearings formed on the frame 13 which supports the booster motor, the frame being carried by the locomotive trailer truck, the body of which is not shown.

Fixed to the axle 14 of the trailer truck, one of the wheels of which is indicated at 15, is a gear wheel 16. 17 is a gear wheel on the driven shaft 12, and 18 a pinion intermediate the gears 16, 17. This pinion is carried by one end of a rocking device or bell crank 19 pivoted at 20 to the booster carrying frame 13, the other end of the bell crank being engaged by a fluid pressure motor B of any preferred construction. I have shown the device as consisting of a stationary part and a movable part 22, the latter connected by a pin 23 to one corner of the rocking device 19. The movable part 22 is raised when air pressure is supplied to the motor and when raised rocks member 19 to mesh gear 18 with gear 16. A spring 24 returns the movable part to its normal position and operates to disengage gear 18 from gear 16. The rocking member 19, however, is balanced so that gravity tends to move it away from axle 14, the member being weighted as indicated at 25 with this end in view so that should spring 24 break the gear would be held out of engagement with gear 16.

The booster motor is supplied with steam through pipe 26 leading from the steam dome of the locomotive (not shown). Interposed between sections of this pipe and arranged preferably at the back sheet of the boiler, is a throttle valve, the preferred construction of which is shown in Figs. 2 and 3. 27 is a casing having a flange 28 by means of which it is secured to the boiler, the casing extending through the back sheet of the boiler and being fastened thereto by a fitting 29 secured to the inner section of pipe 26. The outer section of pipe 26 is connected to the casing by means of an elbow 30 and union 31. The inner end of the union 31 is formed with a seat 32 against which bears a revoluble valve 33 fixed to the end of a shaft 34 which projects through a gland 35 in the lower portion of the valve casing. The shaft 34 is supported in suitable bearings (not shown) on the end of the boiler and is provided at its outer end with an operating lever 36.

My invention contemplates an arrangement of the booster motor controlling devices whereby the entrainment of the booster motor with the locomotive axle 14, which it drives, is conditioned upon the opening of two valves in the air pipe which supplies motor B with compressed air. One of these valves, designated A in the drawings, is opened when the reverse lever of the locomotive, designated 37 in Fig. 1, is moved to its extreme forward position, the position which it occupies when the locomotive is started. The other valve device, designated generally by numeral 38, is operated from shaft 34, the rotation of which opens the booster throttle valve 33. 39 is a compressed air reservoir connected by pipes 40, 41 and 42 with valves 38 and A and entraining motor B.

In starting up the locomotive the engine man moves the reverse lever to the extreme forward position on quadrant 43, as shown in Fig. 1. The lever actuates the valve device A to put pipe 41 in communication with pipe 42. This valve device is preferably the same as the reverse lever actuated valve device shown in the Ingersoll patent above referred to. It comprises (Fig. 4) a casing 44 formed with a duct 45 with which pipe 41 communicates, a duct 46 with which pipe 42 communicates, a valve chamber 47 communicating with duct 45 and connected by a duct 48 with the duct 46. Within duct 48 is a bushing 49 formed with valve seats 50, 51 at opposite ends, the bushing having a port 52 in the side by which communication is established between the interior of the bushing and duct 46. Within the bushing is a double valve 53, one head of which 54 is normally pressed by spring 55 against the seat 50, the other end of which bears against the bonnet 56 which closes the lower end of valve casing 44. The head 57 of the double valve 53 normally stands out of contact with its seat 51. The upper end of the casing 44 is in the form of a hollow cylinder 58. In this cylinder is arranged a hollow piston 59 having a stud 60 which projects through a bushing 61 closing the upper end of the cylinder. The stud 60 is adapted to be engaged by the reverse lever 37 when the latter is moved to its extreme forward position. Within the hollow portion of piston 59 is arranged a secondary piston 62 which is held by spring 63 against a bushing 64 secured to the lower end of piston 59. The piston 62 is adapted to bear against the head 57 of the double valve 53 to seat this end of the valve and unseat the other end when the reverse lever is brought to bear against stud 60. Below the double piston structure 59, 62, is a chamber 65 having an exhaust port 66 to the atmosphere. In the position of the double valve 53 shown in Fig. 4, communication is closed between pipes 41, 42 and an exhaust is opened from pipe 42 and cylinder 21 to the atmosphere. When the reverse lever engages stud 60 this exhaust port is closed and pipe 42 is put in communication with pipe 41 to allow air pressure to enter the cylinder 21 of the entraining motor B as soon as valve 38 is opened, this valve normally blocking the flow of air from the reservoir 39 to valve device A.

The valve device 38 (Fig. 5) comprises a casing 67 having ports 68, 69 in opposite sides thereof with which pipes 40, 41 communicate, respectively. In this casing is a rocking valve 70 adapted to close port 69, the valve being fixed to a spindle 71 which extends through the valve casing and is provided with a crank 72 connected by a link 73 with a crank 74 on the lever 34. The arrangement is such that the air port 69, being smaller than the port controlled by the booster throttle valve 33, will be fully open before the booster throttle valve has been moved sufficiently to allow any appreciable flow of steam from the locomotive boiler to the booster motor. At the time port 69 is open the air passageway through the valve A is open since, in the ordinary operation of the locomotive, the engine man will first put his reverse lever in its forward position and thereafter operate the throttle levers of the main driving means and booster. The action of the air pressure being very rapid, the entrainment of the booster motor will take place before it is supplied with steam in sufficient volume to set it in operation. Similarly the disentrainment of the booster will not take place until the steam supply thereto has been considerably throttled so that the engine is stopped or very much slowed down.

In the ordinary operation of a locomotive, after a certain speed has been attained, the engine man pulls back the reverse lever to shorten the valve movement of his engine. This involves, in the booster control system shown, putting the booster out of operation since as soon as the reverse lever moves out of contact with the stud 60 of valve device A communication will be shut off from pipes 41 and 42. The booster may also be put out of operation, at the will of the engine man, by manipulation of the lever 36 which not only shuts off steam from the booster but also effects its disentrainment from the locomotive axle.

In Figs. 6 and 7 I have shown a modification or rather a further development of the control mechanism just described, the object of this development being to make it impossible for the engine man to put the booster into operation unless the main driving mechanism of the locomotive is functioning, or to keep the booster in operation after the main driving means has ceased to propel the locomotive. The booster engine is not intended to, nor will it ordinarily have sufficient power to propel the locomotive alone. Its independent use, either accidental or with deliberate intent, might involve injury to the engine or its connections, and this possibility is obviated by the arrangement shown in Figs. 6 and 7 in which the booster operating lever 36ª is arranged back of the main throttle lever 75 of the locomotive. The latter is shown as pivoted to the end of the boiler at 76. Its connection to the throttle valve is indicated at 77 and the quadrant for the lever at 78. In the arrangement shown the main throttle valve may be opened, if the engine man so desires, without cutting in the booster, and after both main driving means and booster have been put into operation lever 36 may be moved to cut out the booster, but it is not possible either to cut in the booster without opening the main throttle nor is it possible to close the main throttle without moving the booster control lever to the position which puts the booster motor out of operation.

I claim:

1. In combination with a locomotive having a propelling gear wheel, a booster motor, a gear wheel driven thereby, a pinion intermediate said gear wheels supported so that gravity tends to disentrain it from the first named gear wheel, and means for moving said pinion into mesh with said first named gear wheel.

2. In combination with a locomotive having a propelling gear wheel, a booster motor, a gear wheel driven thereby, a pinion intermediate said gear wheels supported so that gravity tends to disentrain it from the first named gear wheel, a fluid pressure actuating motor for moving the pinion into mesh with the first named gear wheel, and a spring tending to move said pinion out of mesh therewith.

3. In combination with a locomotive having a propelling gear wheel, a booster motor, a gear wheel driven thereby, a pinion intermediate said gear wheels, a rocking member on one end of which said pinion is mounted, and means for rocking said member to entrain the pinion with said first named gear wheel.

4. In combination with a locomotive having a propelling gear wheel, a booster motor, a gear wheel driven thereby, a pinion intermediate said gear wheels, a rocking member on one end of which said pinion is mounted, and means for rocking said member to entrain the pinion with said first named gear wheel; the rocking member and pinion being constructed and arranged so that gravity tends to move the pinion out of mesh with said first named gear wheel.

5. In combination with a locomotive having a propelling gear wheel, a booster motor, a gear wheel driven thereby, a pinion intermediate said gear wheels, a rocking member on which said pinion is mounted, a fluid pressure actuated motor engaging said rocking member to rock the same and bring the pinion into mesh with the first named gear wheel, and a spring which tends to rock said member in the opposite direction.

6. In combination with a locomotive having a propelling gear wheel, a booster motor, a gear wheel driven thereby a pinion intermediate said gear wheels, a rocking member on which said pinion is mounted, a fluid pressure actuated motor engaging said member to rock the same and bring the pinion into mesh with the first named gear wheel, and a spring which tends to rock said member in the opposite direction; such member and pinion being constructed and arranged so that gravity tends to move the pinion away from said first named gear wheel.

7. In combination with a locomotive and a booster motor therefor, a device for entraining the booster motor with the locomotive, a valve to control the supply of steam to the booster, and a single manually operated element, the movement of which effects the entrainment of the booster and the supply of the same with steam.

8. In combination with a locomotive and a booster motor therefor, a device for entraining the booster motor with the locomotive, a valve to control the supply of steam to the booster, and a single manually operated element, the movement of which effects first the entrainment of the booster with the locomotive and thereafter the supply of the booster motor with steam.

9. In combination with a locomotive and a booster motor therefor, a device for entraining the booster motor with the locomotive which device is actuated by fluid pressure, a valve to control the supply of fluid pressure thereto, a valve to control the supply of steam to the booster motor, and a single actuating member for operating both said valves.

10. In combination with a locomotive and a booster motor therefor, a device for entraining the booster motor with the locomotive which device is actuated by fluid pressure, a valve to control the supply of fluid pressure thereto, a valve to control the supply of steam to the booster motor, and a single actuating member for operating both said valves to first effect the entrainment of the booster and thereafter the supply of the same with steam.

11. In combination with a locomotive and a booster motor therefor, a fluid pressure operating device for entraining the booster motor with the locomotive, a valve to control the supply of fluid pressure thereto, a valve to control the supply of steam to the booster motor, and a hand lever and connections therefrom to said valves for operating the same by the movement of the lever.

12. In combination with a locomotive and a booster motor therefor, a fluid pressure operating device for entraining the booster motor with the locomotive, a valve to control the supply of fluid pressure thereto, a valve to control the supply of steam to the booster motor, and a hand lever and connections therefrom to said valves for operating the same by the movement of the lever to first effect the entrainment of the booster with the locomotive and thereafter the supply of the same with steam.

13. The combination with the main driving means of a locomotive and its throttle lever, of a booster motor having a lever for controlling its operation arranged with respect to the main throttle lever so that it can be moved to put the booster motor into operation only when the main driving means of the locomotive is supplied with steam and must be moved to put the booster motor out of operation when the steam is shut off from the main driving means.

14. The combination with the main driving means of a locomotive, of a booster motor aiding the main driving means in starting the locomotive and driving the same at low speed, and a pair of controlling levers for the main driving means and booster motor, respectively, arranged so that the operation of the booster motor is possible only when the main driving means is in operation.

15. The combination with the main driving means of a locomotive and its throttle lever of a booster motor, a fluid pressure actuated device for entraining the booster motor with the locomotive, a valve to control the supply of fluid pressure to said device, a valve to control the supply of steam to the booster motor, and a lever to operate said valve arranged with respect to the main throttle lever of the locomotive so that the operation of the booster motor is possible only when the throttle valve of the main driving means is open.

16. The combination with the main driving means of a locomotive and its throttle lever, of a booster motor, a fluid pressure actuated device for entraining the booster motor with the locomotive, a valve to control the supply of pressure fluid to said device, a valve to control the supply of steam to the booster motor, and a lever to operate said valve arranged at substantially right angles to and back of the main throttle lever of the locomotive for the purpose described.

17. In combination with a locomotive, a booster motor for aiding the main driving means in starting the locomotive and propelling the same at low speed, a steam pipe leading from the boiler of the locomotive to the booster motor, a revoluble shaft provided with an operating lever, a valve on said shaft to control the flow of steam to said steam pipe, a pressure actuated device for entraining the booster with the locomotive, a valve to supply fluid pressure to said device and connections between said valve and shaft whereby this and the aforesaid valve are operated by one movement of said lever.

18. In combination with a locomotive, a booster motor for aiding the main driving means in starting the locomotive and propelling the same at low speed, a steam pipe leading from the boiler of the locomotive to the booster motor, a revoluble shaft provided with an operating lever, a valve on said shaft to control the flow of steam to said steam pipe, a pressure actuated device for entraining the booster with the locomotive, a valve to supply fluid pressure to said device and connections between said valve and shaft whereby this and the aforesaid valve are operated by one movement of said lever to first entrain the booster motor with the locomotive and thereafter supply the booster motor with steam.

19. In combination with the main driving means of a locomotive and its throttle valve and throttle valve lever, a booster motor for aiding the main driving means in starting the locomotive and propelling the same at low speed, and a throttle valve and throttle valve lever for the booster motor, the aforesaid levers being arranged so that the operation of the booster motor is possible only when the main driving means of the locomotive is in operation.

20. In combination with the main driving means of a locomotive having a reverse lever and a throttle valve lever, a booster motor having a throttle valve and lever to operate the same, and a fluid pressure actuated mechanism for entraining the booster motor with the locomotive comprising a valve open only when the reverse lever is in the extreme forward position, and a valve open only when the booster throttle valve is open, the entrainment of the booster motor being conditioned upon the opening of both said valves.

21. In combination with the main driving means of a locomotive having a reverse lever and a throttle valve lever, a booster motor having a throttle valve and lever to operate the same, and a fluid pressure actuated mechanism for entraining the booster motor with the locomotive comprising a valve open only when the reverse lever is in the extreme forward position, and a valve open only when the booster throttle valve is open, the entrainment of the booster motor being conditioned upon the opening of both said valves, said throttle valve levers of the main driving means and booster motor being arranged so that the operation of the booster motor is possible only when the main driving means of the locomotive is in operation.

22. The combination with a locomotive having a reverse lever and a throttle valve lever, of a booster motor for aiding the main driving means of the locomotive in starting the same and propelling it at low speed, a valve for controlling the supply of steam to the booster motor a revoluble shaft for operating said valve provided with an operating lever arranged with respect to the main throttle lever of the locomotive so that the booster valve can be opened only when the main throttle of the locomotive is open, a fluid pressure actuated device for entraining the booster motor with the locomotive a supply of pressure fluid, a pipe leading therefrom to the entraining device, two valves arranged in said pipe, one of which is adapted to be opened when the reverse lever is moved to an extreme forward position, and means for connecting the other of said valves to the lever which opens the booster steam valve so that the entrainment of the booster takes place just in advance of the supply of the same with steam.

In testimony whereof, I have hereunto signed my name.

RAY M. BROWN.

DISCLAIMER.

1,380,348.—*Ray M. Brown*, Yonkers, N. Y. CONTROLLING MECHANISM FOR BOOSTER-MOTORS. Patent dated June 7, 1921. Disclaimer filed August 29, 1928, by the assignees, *Howard L. Ingersoll*, the *Locomotive Booster Company*, and *Franklin Railway Supply Company* (assignees not recorded).

Hereby enter this disclaimer to that part of the claims in said specification which are in the following words, to wit:

"3. In combination with a locomotive having a propelling gear wheel, a booster motor, a gear wheel driven thereby, a pinion intermediate said gear wheels, a rocking member on one end of which said pinion is mounted, and means for rocking said member to entrain the pinion with said first named gear wheel.

"4. In combination with a locomotive having a propelling gear wheel, a booster motor, a gear wheel driven thereby, a pinion intermediate said gear wheels, a rocking member on one end of which said pinion is mounted, and means for rocking said member to entrain the pinion with said first named gear wheel; the rocking member and pinion being constructed and arranged so that gravity tends to move the pinion out of mesh with said first named gear wheel."

[*Official Gazette September 25, 1928.*]

DISCLAIMER 1,380,348.—*Ray M. Brown*, Yonkers, N. Y. CONTROLLING MECHANISM FOR BOOSTER-MOTORS. Patent dated June 7, 1921. Disclaimer filed December 4, 1931, by the assignees, *Howard L. Ingersoll, Locomotive Booster Company*, and *Franklin Railway Supply Company*.

Hereby enter this disclaimer to that part of the claims in said specification which are in the following words, to wit:

"5. In combination with a locomotive having a propelling gear wheel, a booster motor, a gear wheel driven thereby, a pinion intermediate said gear wheels, a rocking member on which said pinion is mounted, a fluid pressure actuated motor engaging said rocking member to rock the same and bring the pinion into mesh with the first named gear wheel, and a spring which tends to rock said member in the opposite direction."

[*Official Gazette December 22, 1931.*]